May 22, 1928.
W. T. JOHNSON
CULTIVATOR
Filed Nov. 9, 1926
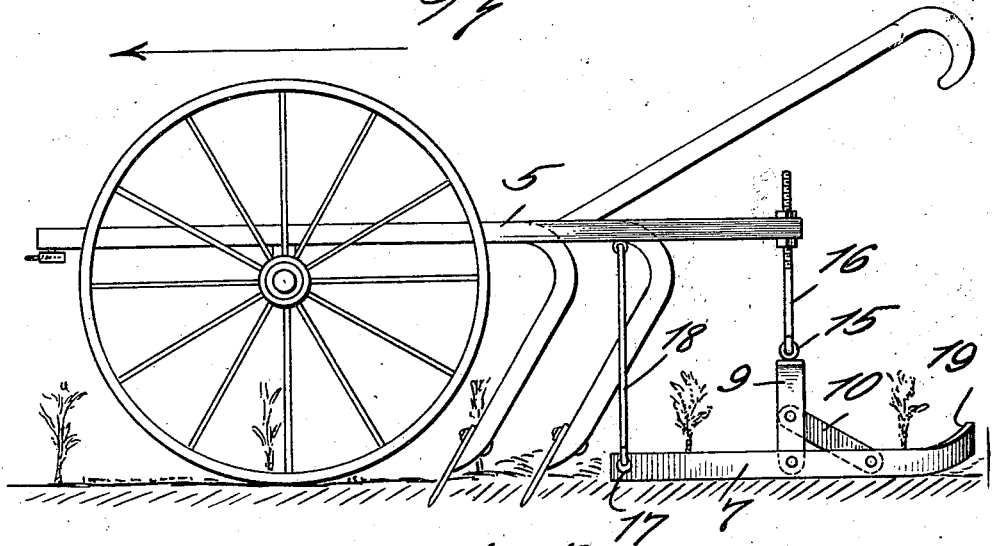
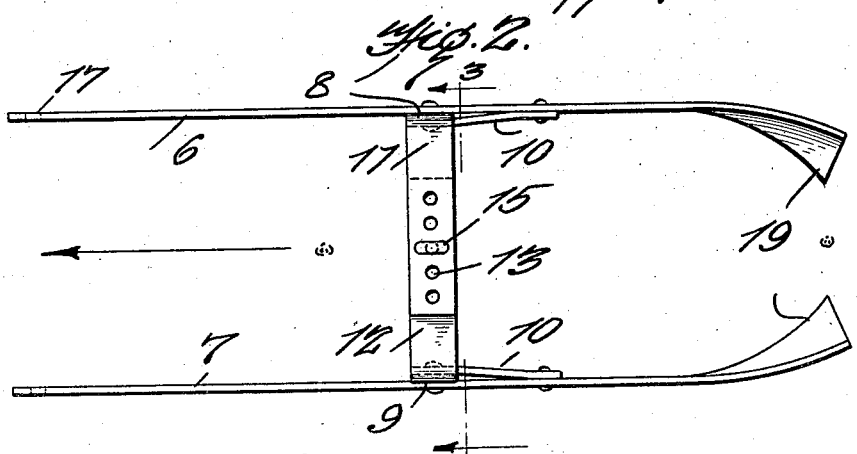
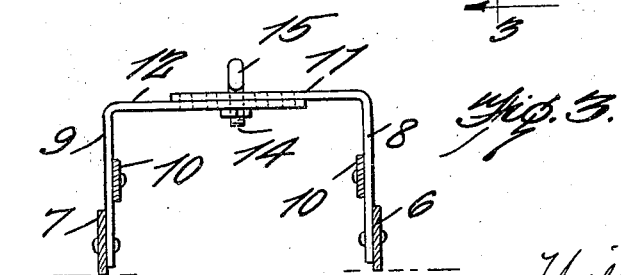

Patented May 22, 1928.

1,670,771

UNITED STATES PATENT OFFICE.

WILLIAM T. JOHNSON, OF CLARENDON, TEXAS, ASSIGNOR OF ONE-HALF TO ROBERT L. BIGGER, OF CLARENDON, TEXAS.

CULTIVATOR.

Application filed November 9, 1926. Serial No. 147,297.

This invention relates to cultivators, and particularly to a device intended for use in the cultivation of small vegetation such as young cotton plants when they are too small to be cultivated by the ordinary plow or cultivator; and it is an object of this invention to provide novel means whereby soil may be displaced and directed or moved toward the plants; and the invention furthermore contemplates the provision of novel means whereby the cultivating elements may be adjusted in order to increase or diminish the distance between them so that when they are operating they will be moved on opposite sides of a row of plants and serve to push earth toward the growing plants without covering them.

It is furthermore an object of this invention to provide means by which a cultivator of this character may be applied to an ordinary shovel cultivator or other implement to which draft means may be supplied.

It is a further object of this invention to produce an attachment of the character indicated which can be constructed from sheet metal of proper gage and produced by the ordinary stamping processes in order that it may be inexpensively manufactured.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a device embodying the invention applied to a conventional type of cultivator;

Figure 2 illustrates a plan view of the said attachment; and

Figure 3 illustrates a sectional view on the line 3—3 of Fig. 2.

In carrying the invention into practice, an ordinary cultivator 5 may be employed, but as the invention can be attached to such a cultivator or any other pulling means, a detailed description of the cultivator will be omitted.

The cultivator of the invention as illustrated comprises two side plates 6 and 7 whose edges stand vertically or approximately so, and these side plates are held in said positions by a sectional yoke formed by the standards 8 and 9 whose lower ends are anchored to the plates 6 and 7, respectively. Braces such as 10 extend from a plate to the corresponding standard and by this means the yoke is held rigid.

The standards have inwardly extending overlapping arms 11 and 12, respectively, and these arms have apertures such as 13 intended to aline for the purpose of the reception of a bolt or fastening 14. The bolt has an eye 15 at its upper end and a link 16 is connected to the said eye and it is intended to be connected to a beam or frame of the cultivator to act as a brace and for holding it at proper position with relation to the draft rigging.

The forward ends of the plates 6 and 7 are each provided with an aperture such as 17, through which fastenings 18 may be inserted for anchoring the forward ends of the plates or blades to the cultivator or draft rigging.

The rear ends of the blades are curved toward each other as indicated at 19 and the said blades are shaped to present the lower rear edges on a plane below the lower edges of the plates in front of the curved portions. The rear edges will thus dip into or penetrate the soil and displace it toward the plant and supply loose earth over the roots of the plant and produce beneficial results which could not be attained through the use of the ordinary shovel cultivator.

I claim:

1. In a cultivator, blades comprising plates located edgewise vertically in spaced relation to each other, means for adjustably retaining the plates in such relation, said plates having inwardly curved rear ends and depending rear edges, and means for connecting the said cultivating mechanism to a draft mechanism.

2. A cultivator having blades composed of plates, means for holding the said plates vertically edgewise and in adjustable relation to each other, the said blades having forward ends provided with apertures for the reception of fastenings by which the blades are attached to a draft rigging, a link adapted to be attached to said draft rigging, means for adjustably connecting the link to the means for holding the blades in operative relation to each other, the said blades having edges depending below the general plane of the blades and curved toward each other, as and for the purpose described.

WILLIAM T. JOHNSON.